Patented May 23, 1933

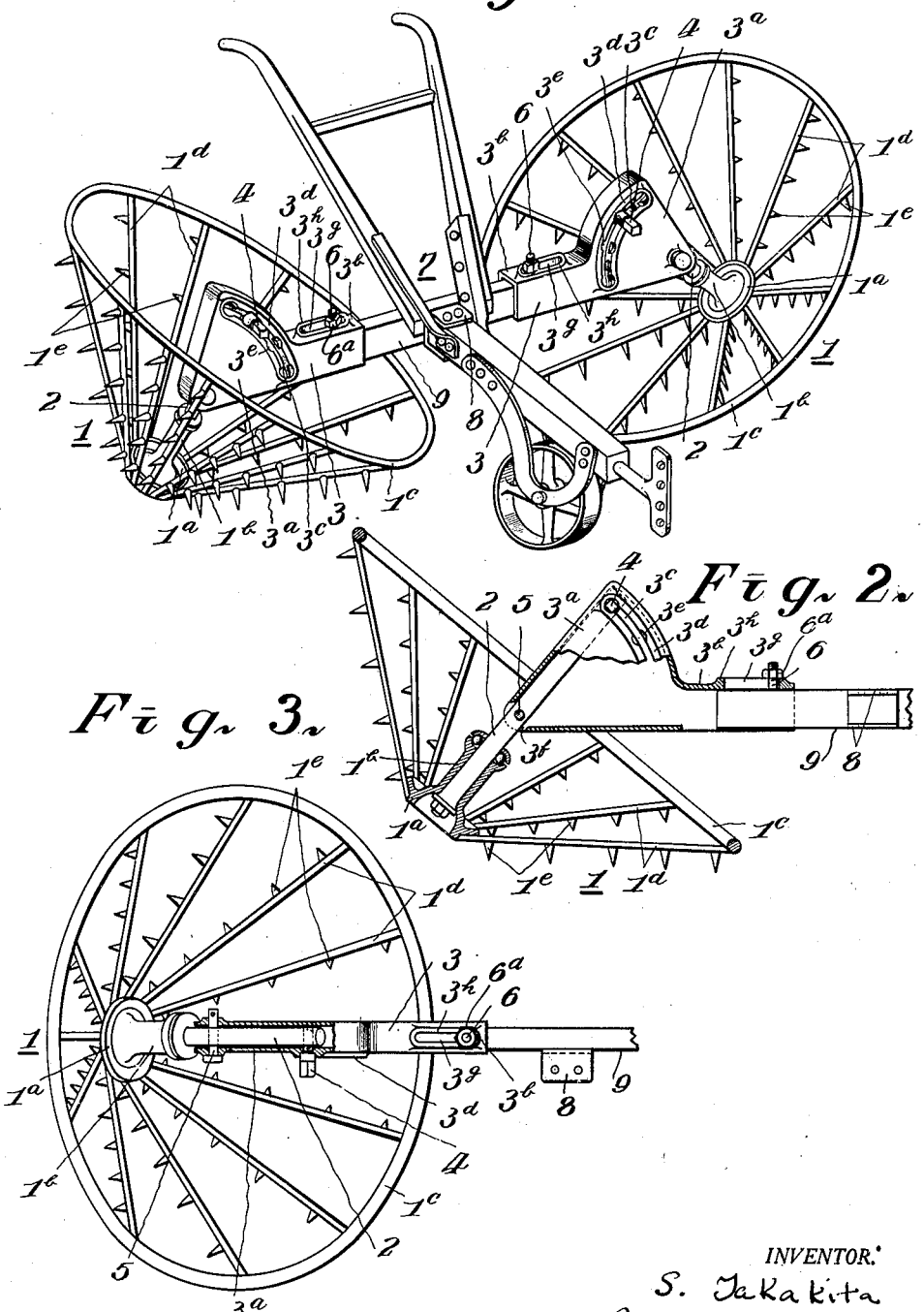

1,910,719

UNITED STATES PATENT OFFICE

SHINJIRO TAKAKITA, OF MIE-KEN, JAPAN

DISINTEGRATOR FOR SOIL

Application filed January 28, 1931. Serial No. 511,831.

This invention relates to disintegrators for soil and has for its object a disintegrator for soil having a greater disintegrating area whereby soil may be very expediently, uniformly and finely disintegrated.

In the accompanying drawing:

Fig. 1 is a perspective view of an embodiment of the invention.

Fig. 2 is a detail sectional view showing the connection of a disintegrating wheel with its carrier member.

Fig. 3 is a detail perspective view, partly in section, showing the connection of a disintegrating wheel with its carrier member.

Referring to the drawing, 1 is a disintegrating wheel substantially of a conical shape in its general outline and consists of a dish-shaped hub $1^a$ having a tubular socket $1^b$ axially extending from inner side of its bottom, a rim $1^c$ and spokes $1^d$ each having a number of tines $1^e$ outwardly extending at the right angle therefrom as shown in Fig. 1. A spindle 2 is rotatably connected by suitable means to the tubular socket $1^b$ of the disintegrating wheel 1. 3 is a carrier member for the disintegrating wheel and comprises a hollow trunk member $3^a$ substantially of a sector shape in its general outline with flat sides and an arm $3^b$ of an inverted U-shaped cross section extending from one end of its arc side along one of its sides corresponding to two binding radii of the sector. The trunk member $3^a$ is formed at its one flat side and near the arc side with an arc-shaped slot $3^c$ having a raised edge $3^d$ formed with a number of supplementary recesses $3^e$ for forming a number of circular recesses for seats of a head of a securing bolt 4 in cooperation with the arc-shaped slot, and is also formed at its apex with an opening $3^f$ through which the spindle 2 is inserted into said trunk member to extend over the arc-shaped slot $3^c$ and to be held in position by means of a pivot pin 5 secured near the apex in such a manner that an angular position of the disintegrating wheel may be adjusted by turning on said pivot pin through an angle included by the sides corresponding to the two binding radii of the sector, as shown in Fig. 2. One end of the spindle 2 in the trunk member $3^a$ is secured in any desired position by means of the securing bolt 4 passed through the arc-shaped slot $3^c$ and screwed in that end with its head resting on the recess $3^e$, as shown in Fig. 3.

In Fig. 1, two disintegrating wheels 1 are interconnected in opposite positions by means of an interconnecting bar 9, the opposite ends of which are inserted into the arms $3^b$ of the carrier members 3 and secured thereto by means of a stud bolt 6 on said bar passing through a slot $3^g$ on the arm $3^b$ with a raised edge $3^h$ and a holding nut $6^a$ whereby the distance between the disintegrating wheels is adjustable. A driving device 7 which may be of well known or suitable type is connected to the bar 9 by means of a channel or angle piece 8 secured thereto.

The disintegrator of the above described construction may be drawn by a horse, an ox or a tractor. The disintegrating wheels are preferably adjusted so as to hold their inner parts slightly from the surface of the earth, whilst their outer parts tread the earth so that the wheels will smoothly rotate, and reduce the labor for drawing the disintegrator.

Having now particularly described and ascertained the nature of my said invention and in what manner the same is to be performed, I claim:—

A disintegrator comprising disintegrating wheels of substantially conical form and having a plurality of spokes provided with tines, spindles rotatably carrying said wheels, substantially triangular hollow trunk members partially receiving said spindles, a pivot pin secured adjacent the apexes of the trunk members, the latter having arc-shaped slots in the base portions thereof, and means co-acting with said slots to secure the spindles.

In testimony whereof I affix my signature.

SHINJIRO TAKAKITA.